US012008773B2

(12) United States Patent
Kawamura

(10) Patent No.: US 12,008,773 B2
(45) Date of Patent: Jun. 11, 2024

(54) OBJECT TRACKING APPARATUS AND CONTROL METHOD THEREOF USING WEIGHT MAP BASED ON MOTION VECTORS

(71) Applicant: CANON KABUSHIKI KAISHA, Tokyo (JP)

(72) Inventor: Yuta Kawamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 17/549,632

(22) Filed: Dec. 13, 2021

(65) Prior Publication Data

US 2022/0198683 A1 Jun. 23, 2022

(30) Foreign Application Priority Data

Dec. 22, 2020 (JP) ................. 2020-212895

(51) Int. Cl.
*G06T 7/254* (2017.01)
*G06T 5/40* (2006.01)
*G06T 5/50* (2006.01)
*G06T 5/73* (2024.01)
*G06V 10/25* (2022.01)

(52) U.S. Cl.
CPC .............. *G06T 7/254* (2017.01); *G06T 5/40* (2013.01); *G06T 5/50* (2013.01); *G06T 5/73* (2024.01); *G06V 10/25* (2022.01); *G06T 2207/20224* (2013.01)

(58) Field of Classification Search
CPC .. G06T 7/254; G06T 5/40; G06T 5/50; G06T 5/73; G06T 2207/20224; G06T 2207/20201; G06V 10/25; G06V 10/62; G06V 10/761; G06V 20/52
See application file for complete search history.

(56) References Cited

U.S. PATENT DOCUMENTS

2017/0163892 A1* 6/2017 Mihic ................. G06T 5/50
2019/0197345 A1* 6/2019 Sawada .............. G06T 7/20

FOREIGN PATENT DOCUMENTS

JP 2012069084 A 4/2012

OTHER PUBLICATIONS

Moving object tracking, Kale et al, 2015 (Year: 2015).*

* cited by examiner

*Primary Examiner* — Jianxun Yang
(74) *Attorney, Agent, or Firm* — CANON U.S.A., INC. IP Division

(57) ABSTRACT

An object tracking apparatus includes a motion vector calculation unit, a feature amount area determination unit, a reliability evaluation unit, a weight map creation unit, and an object tracking unit. The motion vector calculation unit is configured to calculate a motion vector between images. The feature amount area determination unit is configured to determine an area of an object detected from an image as a feature amount area. The reliability evaluation unit is configured to evaluate a reliability of the motion vector between images and a motion vector in the feature amount area. The weight map creation unit is configured to create a weight map based on the motion vector between images, the reliability, and the motion vector in the feature amount area. The object tracking unit is configured to track the object based on the weight map.

10 Claims, 6 Drawing Sheets

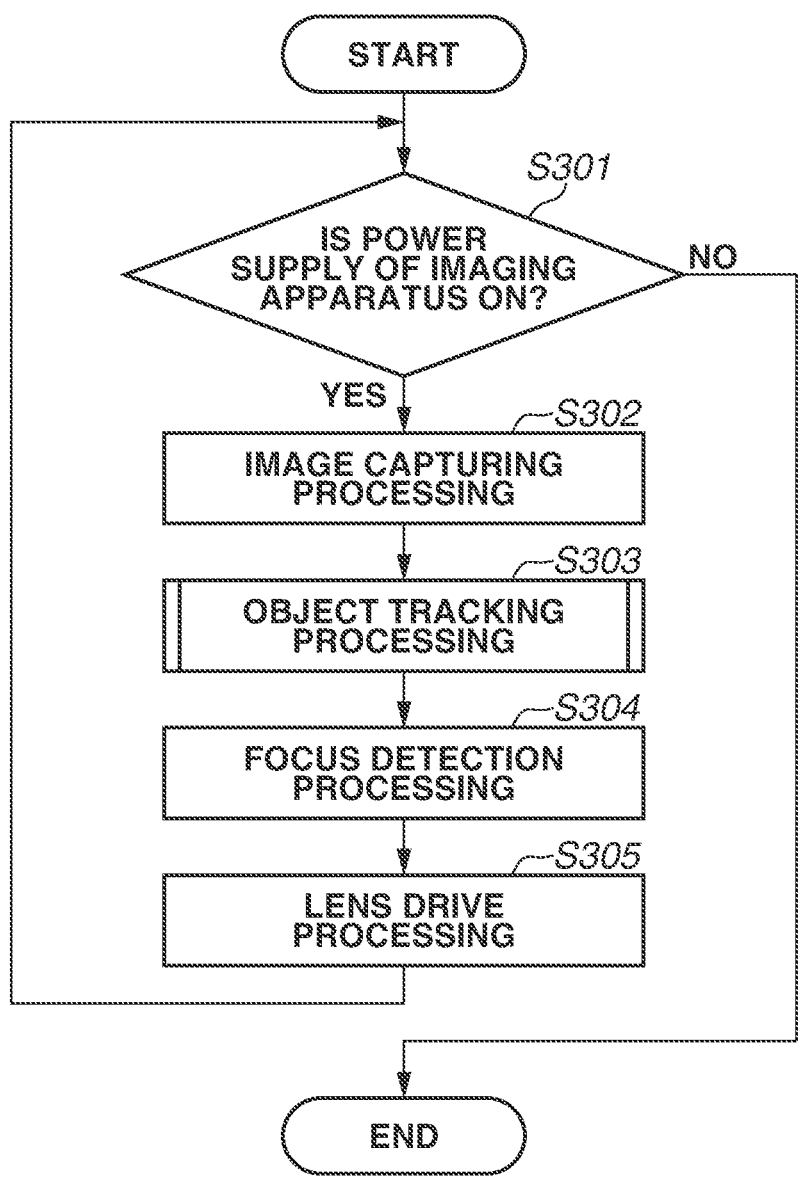

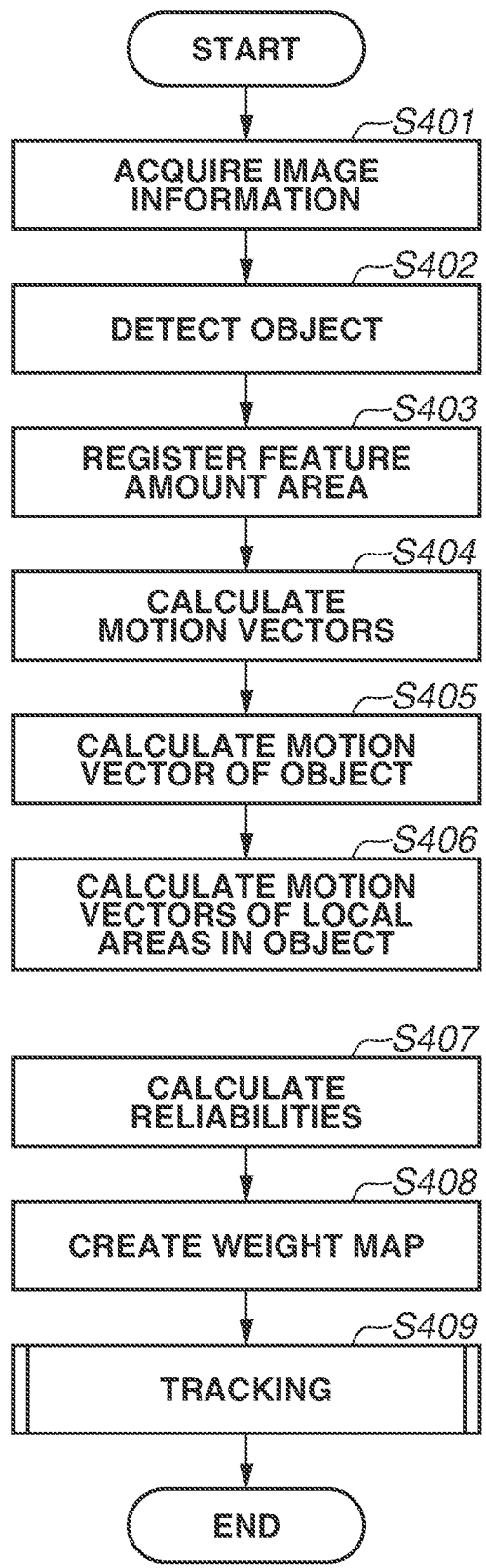

OBJECT TRACKING APPARATUS AND CONTROL METHOD THEREOF USING WEIGHT MAP BASED ON MOTION VECTORS

BACKGROUND

Technical Field

One disclosed aspect of the embodiments relates to an object tracking apparatus having a function of detecting and tracking an object in a captured image and a control method of the object tracking apparatus.

Description of the Related Art

Relating to a digital camera, there is known a technique in which a template about a feature amount in a certain area in an image is created from obtained image data and an object is tracked by performing template matching, and an image of the object is captured while adjusting the object image to suitable focus state, brightness level and color.

Japanese Patent Application Laid-Open No. 2012-69084 discusses a technique of setting an area having a feature amount used for tracking as a template. Even in case where there is a change in a tracking target area, tracking can be performed accurately by applying a weight to the template.

According to the tracking technique discussed in Japanese Patent Application Laid-Open No. 2012-69084, a portion where many changes occur in a tracking target area needs to be recognized in advance. However, if an object exhibits a plurality of movements, such as a person who is running, and a portion that changes cannot be recognized in advance, it is difficult to accurately track the object.

SUMMARY

According to an aspect of the embodiments, an object tracking apparatus including a motion vector calculation unit, a feature amount area determination unit, a reliability evaluation unit, a weight map creation unit, and an object tracking unit. The motion vector calculation unit is configured to calculate a motion vector between images. The feature amount area determination unit is configured to determine an area of an object detected from an image as a feature amount area. The reliability evaluation unit is configured to evaluate a reliability of the motion vector between images and a motion vector in the feature amount area. The weight map creation unit is configured to create a weight map, which is a distribution of weights of areas for which the motion vectors have been calculated, based on the motion vector between images, the reliability, and the motion vector in the feature amount area. The object tracking unit is configured to track the object based on the weight map.

A control method for an object tracking apparatus includes calculating a motion vector between images, determining an area of an object detected from an image as a feature amount area, evaluating a reliability of the motion vector between images and a motion vector in the feature amount area, creating a weight map based on the motion vector between images, the reliability, and the motion vector in the feature amount area, and tracking the object based on the weight map. The weight map is a distribution of weights of areas for which the motion vectors have been calculated.

One aspect of the embodiments enables improving the object tracking performance by using motion vectors per area.

Further features of the disclosure will become apparent from the following description of exemplary embodiments with reference to the attached drawings.

BRIEF DESCRIPTION OF THE DRAWINGS

FIG. 3 is a flowchart illustrating overall processing according to the first exemplary embodiment.

FIG. 4 is a flowchart illustrating object tracking according to the first exemplary embodiment.

DESCRIPTION OF THE EMBODIMENTS

Configuration of Imaging Apparatus

Figure 1:
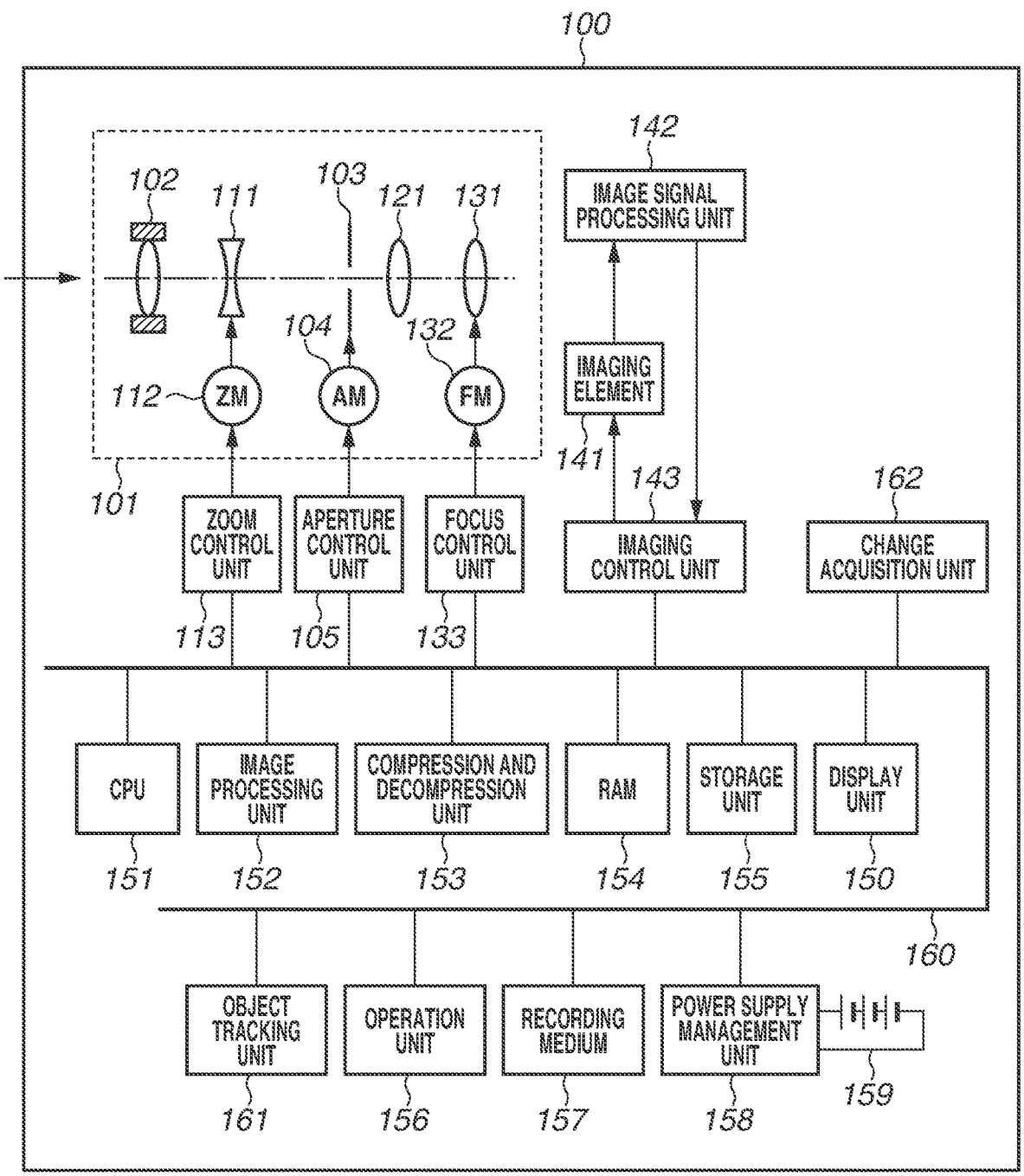
FIG. 1 is a block diagram illustrating a configuration of an imaging apparatus according to a first exemplary embodiment.

Hereinafter, a first exemplary embodiment will be described. Thus, according to the present exemplary embodiment, the object tracking performance is improved by using motion vectors per area. FIG. 1 is a block diagram illustrating a functional configuration example of an imaging apparatus 100, which is an example of an object tracking apparatus according to the present exemplary embodiment. The imaging apparatus 100 can capture and record videos and still images. The functional blocks in the imaging apparatus 100 are connected to each other to achieve mutual communication via a bus 160. The operation of the imaging apparatus 100 is realized by causing a central processing unit (CPU) 151 to execute a program and to control the functional blocks.

The imaging apparatus 100 according to the present exemplary embodiment includes an imaging circuit (not shown) to capture and record videos and still images and an object tracking unit 161 that detects a certain object from the captured image and continuously tracks the detected object from a plurality of images. The object tracking unit 161 has an object detection function of detecting the location and size of an imaging target object, an object tracking function of tracking the object by continuously searching for an area similar to a detected area, and a motion vector detection function of obtaining a motion vector between images. The configuration and operation of the object tracking unit 161 will be described in detail below.

An imaging lens 101 (a lens unit) includes a fixed group-1 lens 102, a zoom lens 111, an aperture 103, a fixed group-3 lens 121, a focus lens 131, a zoom motor 112, an aperture motor 104, and a focus motor 132. The fixed group-1 lens 102, the zoom lens 111, the aperture 103, the fixed group-3 lens 121, and the focus lens 131 constitute an imaging optical system. While the above lenses 102, 111, 121, and 131 are each illustrated as a single lens for convenience, each of these lenses may consist of a plurality of lenses. The imaging lens 101 may be an interchangeable lens that is attachable to and removable from the imaging apparatus 100.

An aperture control unit 105 controls the operation of the aperture motor 104 that drives the aperture 103. In this way, the aperture diameter of the aperture 103 is changed. The zoom control unit 113 controls the operation of the zoom motor 112 that drives the zoom lens 111. In this way, the focus length (the angle of view) of the imaging lens 101 is changed.

A focus control unit 133 calculates the defocus amount and the defocus direction of the imaging lens 101 based on the phase difference between a pair of focus detection signals (images A and B) obtained from an imaging element 141. The focus control unit 133 converts the defocus amount and the defocus direction into the drive amount and the drive direction of the focus motor 132. Based on the drive amount and the drive direction, the focus control unit 133 controls the operation of the focus motor 132 to drive the focus lens 131. In this way, the focus state of the imaging lens 101 is controlled.

As described above, the focus control unit 133 performs auto-focusing (AF) based on a phase difference detection method. Alternatively, the focus control unit 133 may perform AF based on a contrast detection method using contrast evaluation values obtained from image signals obtained from the imaging element 141.

An object image formed by the imaging lens 101 on the imaging surface of the imaging element 141 is converted into an electric signal (an image signal) by photoelectric conversion elements included in a plurality of pixels arranged in the imaging element 141. In the present exemplary embodiment, in the imaging element 141, m×n the pixels (n and m are each an integer of 2 or more) are arranged in a matrix. In the matrix, m pixels are lined in the horizontal direction and n pixels are lined in the vertical direction. Each pixel includes two photoelectric conversion elements (photoelectric conversion areas). An imaging control unit 143 controls reading of the signals from the imaging element 141 in response to an instruction from the CPU 151.

The image signal read from the imaging element 141 is supplied to an image signal processing unit 142. The image signal processing unit 142 applies signal processing, such as noise reduction processing, analog/digital (A/D) conversion processing, and automatic gain control processing, to the image signal and outputs the resultant image signal to the imaging control unit 143. The imaging control unit 143 accumulates the image signal received from the image signal processing unit 142 in a random access memory (RAM) 154.

A change acquisition unit 162 is constituted by a position and orientation sensor, such as a gyroscope sensor, an acceleration sensor, or an electronic compass, and measures positional and orientational change in the imaging scene of the imaging apparatus 100. The acquired positional and orientation change is stored in the RAM 154, and the object tracking unit 161 refers to the stored positional and orientation change.

An image processing unit 152 applies predetermined image processing to image data stored in the RAM 154. Examples of the image processing that the image processing unit 152 performs include signal format conversion processing, scaling processing, etc., in addition to development processing such as white balance adjustment processing, color interpolation (demosaic) processing, and gamma correction processing. However, the image processing is not limited to the above examples. The image processing unit 152 can also generate, for example, information about the luminance of an object for auto exposure (AE). Information about a certain object area may be supplied by the object tracking unit 161 and may be used for white balance adjustment processing, for example. In a case where AF is performed by a contrast detection method, the image processing unit 152 may generate AF valuation values. The image processing unit 152 stores the processed image data in the RAM 154.

In a case where image data stored in the RAM 154 is recorded, for example, the CPU 151 adds a predetermined header to the image data and generates a data file based on a recording format. In this operation, as needed, the CPU 151 causes a compression and decompression unit 153 to encode the image data to compress the amount of information. The CPU 151 records the generated data file in a recording medium 157 such as a memory card.

When image data stored in the RAM 154 is displayed, the CPU 151 first causes the image processing unit 152 to perform scaling on the image data so that the image data will match the display size of a display unit 150 and then writes the resultant image data in an area used as a video memory (a video RAM area) in the RAM 154. The display unit 150 reads the image data to be displayed from the VRAM area in the RAM 154 and displays the read image data on a display device, such as a liquid crystal display (LCD) or an organic electroluminescence (EL) display.

The imaging apparatus 100 according to the present exemplary embodiment causes the display unit 150 to function as an electronic view finder (EVF) by causing the display unit 150 to immediately display a video captured during video capturing (during an imaging standby state or during a video recording state). The moving images and frame images thereof displayed by the display unit 150 functioning as an EVF are called live view images or through-the-lens images. When the imaging apparatus 100 captures still images, the imaging apparatus 100 displays the previously captured still image on the display unit 150 for a certain time so that the user can check the capturing result. These display operations are also realized under control of the CPU 151.

An operation unit 156 includes switches, buttons, keys, and a touch panel with which the user can input an instruction to the imaging apparatus 100. The CPU 151 detects an instruction that has been input through the input operation unit 156, via the bus 160 and controls various units to realize the operation based on the inputted instruction.

The CPU 151 includes at least one programmable processor such as a CPU or a micro processing unit (MPU) and controls each of the units by reading a program stored in a storage unit 155 or the like into the RAM 154 and executing the read program. In this way, the function of the imaging apparatus 100 is realized. The CPU 151 also performs AE processing for automatically determining the exposure conditions (the shutter speed or the accumulation time, the aperture value, and the sensitivity) based on information about the luminance of the object. The information about the luminance of the object can be acquired from the image processing unit 152, for example. The CPU 151 can determine the exposure conditions by using the area of a certain object, such as the face of a person, as a reference.

The CPU 151 uses a fixed aperture during video capturing and controls the exposure with the electronic shutter speed (the accumulation time) and the magnitude of the gain. The CPU 151 notifies the imaging control unit 143 of the accumulation time and the magnitude of the gain determined. The imaging control unit 143 controls the operation of the imaging element 141 so that imaging will be performed in accordance with the above exposure conditions.

The result obtained by the object tracking unit 161 can be used for automatic setting of a focus detection area, for example.

As a result, the tracking AF function with respect to a certain object area can be realized. In addition, it is possible to perform AE processing based on the luminance information about the focus detection area and image processing (for example, gamma correction processing, white balance adjustment processing, etc.) based on the pixel values in the focus detection area. In addition, it is possible to correct an image blur by using the motion vector between images calculated by the object tracking unit 161. Specifically, the image processing unit 152 refers to the motion vector between images calculated by the object tracking unit 161 and calculates a component based on a blur caused by the imaging apparatus 100. By driving the lenses in the imaging lens 101 such that the blur is corrected, the image blur can be corrected. In addition, while not illustrated, a drive element may be installed in the imaging element 141, and the position of the imaging element 141 may be controlled such that the blur caused by the imaging apparatus 100 is corrected.

The CPU 151 may superimpose a marker, e.g., a rectangular frame surrounding an area, representing the location of the current object area on a display image.

Figure 2:
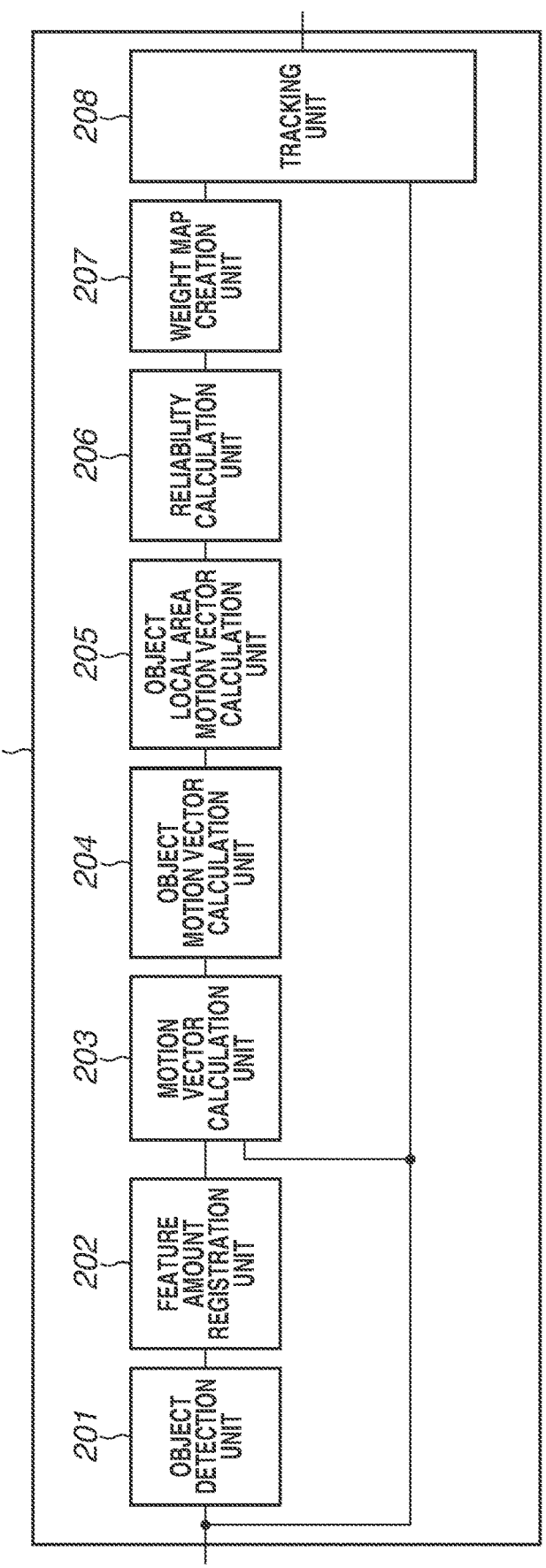
FIG. 2 is a block diagram illustrating a configuration of an object tracking unit according to the first exemplary embodiment.

A battery 159 is managed by a power supply management unit 158 and supplies power to the entire imaging apparatus 100. The storage unit 155 stores a program executed by the CPU 151, setting values necessary for execution of the program, GUI data, user setting values, etc. For example, when the user gives an instruction for transition of the power state from an OFF state to an ON state by operating the operation unit 156, the program stored in the storage unit 155 is read to an area in the RAM 154, and the CPU 151 executes the program such that the CPU 151 functions as various units described in the following Configuration of Object Tracking Unit FIG. 2 is a block diagram illustrating a functional configuration example of the object tracking unit 161.

An object detection unit 201 is sequentially supplied with image signals from the image processing unit 152 in chronological order, detects a certain object as an imaging target included in each image, and determines an object area including the detected object. The object detection unit 201 outputs, as an object detection result, information about the location of the object area in the individual image, information about the reliability of the detection accuracy, etc.

A feature amount registration unit 202 registers the image data of the object area detected by the object detection unit 201 as a feature amount area.

A motion vector calculation unit 203 calculates a motion vector between images from the sequentially supplied images.

An object motion vector calculation unit 204 calculates a motion vector in the entire feature amount area registered by the feature amount registration unit 202.

An object local area motion vector calculation unit 205 calculates motion vectors in local areas in the feature amount area registered by the feature amount registration unit 202.

A reliability calculation unit 206 calculates the reliability of the motion vector calculated by the motion vector calculation unit 203.

A weight map creation unit 207 creates a map of weights in the registered feature amount area by using the motion vectors in the local areas in the feature amount area calculated by the object local area motion vector calculation unit 205 and the reliability calculated by the reliability calculation unit 206.

A tracking unit 208 searches the sequentially supplied images for an area having a high similarity to the feature amount area registered by the feature amount registration unit 202 as the object area, by using the weight map created by the weight map creation unit 207. The search result includes information about the object area in the image, the reliability, the motion vector in the object, etc. and is used by various kinds of processing blocks such as the CPU 151.

Processing Flow of Imaging Apparatus

A video capturing operation performed by the imaging apparatus 100 according to the present exemplary embodiment will be described with reference to a flowchart in FIG. 3. The video capturing operation includes processing for object detection, object tracking, and motion vector detection for detecting a motion vector between images. The CPU 151 performs the steps in the present flowchart or each of the units performs these steps in accordance with instructions from the CPU 151. This video capturing operation is executed when the imaging apparatus 100 is set to the imaging standby state or the video recording state. These states differ from each other, for example, in supported image (frame) resolutions. However, since the processing for object detection, object tracking, and motion vector detection for detecting the motion vector in the object and the background are basically the same between the imaging standby state and the video recording state in term of the processing content, the following description will be made without distinguishing the above states in particular.

In step S301, the CPU 151 determines whether the power supply of the imaging apparatus 100 is ON. If the power supply is not ON (NO in step S301), the CPU 151 ends the present processing. If the power supply is ON (YES in step S301), the processing proceeds to step S302.

In step S302, the CPU 151 performs image capturing processing on one frame by controlling each of the units. Next, in step S303, a pair of parallax images and a captured image for one screen are generated and stored in the RAM 154.

In step S303, the CPU 151 causes the object tracking unit 161 to perform the processing for object detection, object tracking, and motion vector detection for detecting a motion vector between images. The processing will be described in detail below. The object tracking unit 161 notifies the CPU 151 of the location and size of the object area and the motion vector, and these items of information are stored in the RAM 154. Based on this object area, the CPU 151 sets a focus detection area.

In step S304, the CPU 151 causes the focus control unit 133 to perform focus detection processing. The focus control unit 133 generates an image (signal) A by combining a plurality of signals A and an image (signal) B by combining a plurality of signals B, the signals A and the signals B having been obtained from a plurality of pixels lined in the same row among a plurality of pixels included in the focus detection area in the pair of parallax images. Next, the focus control unit 133 calculates a correlation amount between the images A and B while shifting the relative position between the images A and B and obtains a relative position at which the similarity between the images A and B is the highest, as a phase difference (shift amount) between the images A and B. In addition, the focus control unit 133 converts the phase difference into a defocus amount and a defocus direction.

In step S305, the focus control unit 133 drives the focus motor 132 in accordance with a lens drive amount and a drive direction corresponding to the defocus amount and the defocus direction obtained in step S304, so as to move the focus lens 131. After the lens drive processing, the processing returns to step S301.

Hereinafter, until the CPU 151 determines that the power supply switch is OFF in step S301, the CPU 151 repeats steps S302 to S305. In this way, the object tracking function is realized by searching a plurality of chronological images for an object area. While the object tracking processing is performed per frame in FIG. 3, the object tracking processing may be performed every few frames to reduce the processing load and power consumption.

Flow of Object Tracking Processing

The flow of processing performed by the object tracking unit 161 will be described with reference to a flowchart in FIG. 4.

The steps in the flowchart are performed by the CPU 151 or each of the units in accordance with instructions from the CPU 151.

First, in step S401, an input image is supplied from the imaging control unit 143 to the object tracking unit 161.

In step S402, the object detection unit 201 sets a plurality of evaluation areas, which are different from each other in center location and size, on the image input from the imaging control unit 143 and detects an object from each of the evaluation areas. An arbitrary known technique may be used as the object detection technique. For example, an object may be detected automatically by processing for extracting a feature of a certain object based on a convolutional neutral network (CNN). Alternatively, the user may specify an object by inputting a signal through a touch operation on the operation unit 156.

In step S403, the feature amount registration unit 202 registers an object area detected by the object detection unit 201 as the feature amount area. Alternatively, the feature amount registration unit 202 registers, as the feature amount area, an object area in the previous frame, which has been detected by the tracking unit 208 and stored in the RAM 154. In the present exemplary embodiment, in the first frame, the result obtained by the object detection unit 201 is used as the feature amount area to be registered, and in the subsequent frames, the result of the previous frame obtained from the tracking unit 208 is used.

In step S404, the motion vector calculation unit 203 uses the current frame image and the previous frame image among the images sequentially supplied in step S401 and calculates a motion vector (a first motion vector) of each pixel. An arbitrary known technique may be used as the first motion vector calculation method. In the present exemplary embodiment, the Lucas Kanade method is used. The present exemplary embodiment assumes that the luminance at a coordinate (x, y) in a frame at time t is denoted by Y(x, y, t) and that the luminance at a pixel after movement in a frame after time Δt is denoted by Y(x+Δx, y+Δy, t+Δt). In this case, by solving mathematical equation (1), Δx and Δy are calculated as a motion vector in each pixel.

$$Y(x,y,t) = Y(x+\Delta x, y+\Delta y, t+\Delta t) \quad (1)$$

The first motion vector calculated in this step indicates the amount of movement in consecutively captured images per unit time, that is, the amount of movement of the imaging apparatus 100. It is possible to control the correction of the image blur by causing the image processing unit 152 to refer to the values of these first motion vectors and to drive the necessary lenses.

In step S405, the object motion vector calculation unit 204, which calculates a motion vector (a second motion vector) of the whole object, calculates a single motion vector for the object from the first motion vectors calculated in step S404 and the feature amount area registered in step S403. In the second motion vector calculation method, the plurality of vectors calculated in step S404 are subjected to histogram processing in the feature amount area, and a bin having the maximum number is calculated as the motion vector of the object.

In step S406, the object local area motion vector calculation unit 205, which calculates the motion vectors (third vectors) in local areas of the object, calculates, from the first motion vectors calculated in step S404 and the second motion vector calculated in step S405, the motion vectors in local areas in the feature amount area registered in step S403, as third motion vectors. In the third motion vector calculation method, the object local area motion vector calculation unit 205 calculates, as a third motion vector, a difference value between a first motion vector calculated in step S404 and the second motion vector calculated in step S405.

In step S407, the reliability calculation unit 206 calculates the reliabilities of the first motion vectors calculated in step S404. In the Lucas Kanade method, by solving mathematical equation (1), the reliabilities can be acquired simultaneously with the first motion vectors. Thus, these reliabilities may be used. Alternatively, edge extraction processing may be performed to determine low contrast areas, and the reliabilities of these low contrast areas may be reduced. Still alternatively, occlusion determination may be performed, and the reliabilities of the occlusion areas may be reduced. The technique of determining the reliabilities is not limited to any particular technique.

Figure 5A:
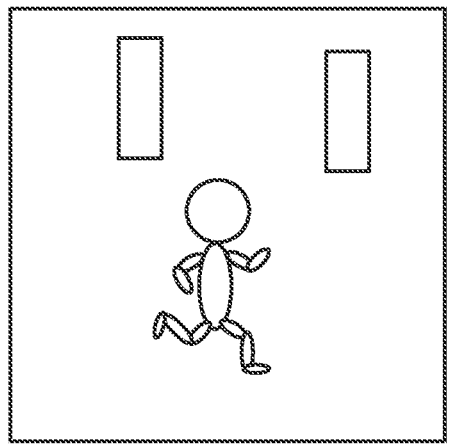
FIGS. 5A to 5F illustrate creation of a weight map according to the first exemplary embodiment.
Figure 5B:
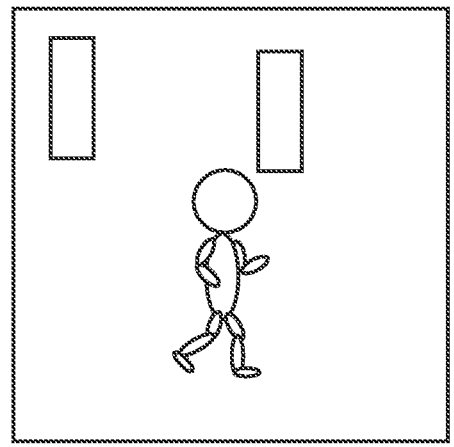
Figure 5C:
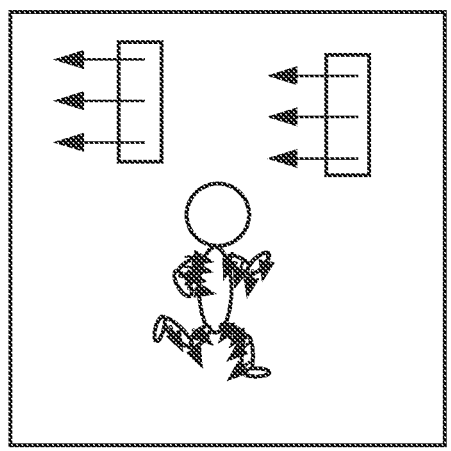

In step S408, the weight map creation unit 207 creates a map of weights in the feature amount area registered in step S403, based on the third motion vectors calculated in step S406 and the reliabilities calculated in step S407. FIGS. 5A to 5F illustrate an overview of the creation of a weight map by using the motion vectors. Assuming that FIG. 5A illustrates an image in the previous frame and FIG. 5B illustrates an image in the current frame, the motion vectors as illustrated in FIG. 5C are calculated in step S404.

Figure 5D:
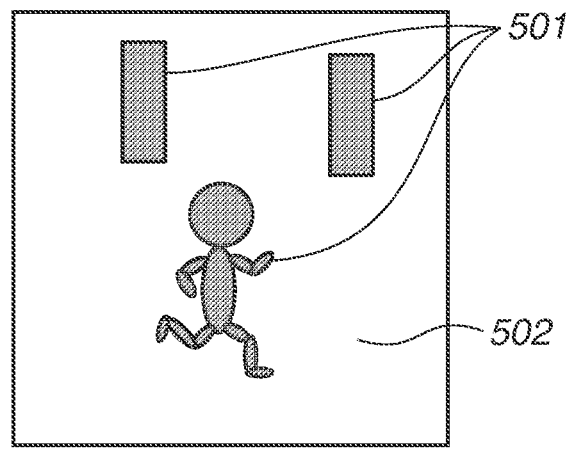

FIG. 5D illustrates a reliability map calculated in step S407. In determining to which position in the current frame the position of a pixel in the previous frame has moved, each black area 501 indicates an area that is evaluated as having a high reliability as a result of determining movement between respective pixels in the previous and current frames. In determining to which position in the current frame the position of a pixel in the previous frame has moved, a white area 502 indicates an area that is evaluated as having a low reliability as a result of determining movement between respective pixels in the previous and current frames, in contrast to the black areas 501.

Figure 5E:
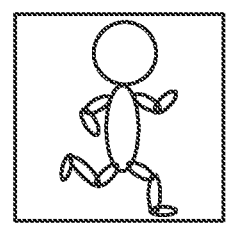
Figure 5F:
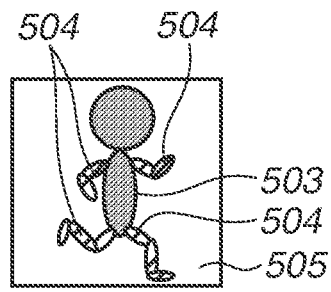

Assuming that FIG. 5E illustrates the feature amount area registered in step S403, FIG. 5F illustrates a weight map created from the reliabilities, the first motion vectors, and the second motion vector. Regarding the sizes of the motion vectors used in FIG. 5F, the third motion vectors obtained by cancelling the second motion vector calculated in step S405 from the first motion vectors calculated in step S404 are used in step S406. A black area 503 is an area indicating a high reliability and having small third motion vectors, and the weight is set to 1. Each hatched area 504 is an area indicating a high reliability and having large third motion vectors, and the weight is set to 0.5. A white area 505 is an area indicating a low reliability regardless of the third motion vectors, and the weight is set to 0. In the present exemplary embodiment, the size of each third motion vector is indicated by a large value or a small value, that is, a binary value. However, multivalued representation may alternatively be used to indicate the size of the individual third motion vector. In this case, the weight is approximated to 0 as the third motion vector is larger, and the weight is approximated to 1 as the motion vector is smaller. Likewise, in the present exemplary embodiment, the individual reliability indicates a large value or a small value, that is, a binary value. However, multivalued representation may alternatively be used to indicate the reliability. In this case, the weight is approximated to 0 as the reliability is higher, and the weight is approximated to 0 as the reliability is lower. That is, the weight map indicates a distribution of weights, each of which is for a corresponding one of the areas for which the motion vectors have been calculated.

In step S409, the tracking unit 208 tracks the object from the sequentially supplied images by using the feature amount area registered in step S403 and the weight map created in step S408. Details of the object tracking processing will be described in below.

Details of Object Tracking Processing

The tracking processing in step S408 in FIG. 4 will be described with reference to FIG. 6.

The tracking unit 208 searches for an object area by using the feature amount area registered in step S403. The tracking unit 208 outputs the search result. In the present exemplary embodiment, a search method based on template matching in which a feature amount area is used as a template is applied, and the following description will be made with reference to FIGS. 6A to 6C. Template matching is a technique in which a pixel pattern is set as a template, and an area having the highest similarity to the template is searched for in an image. As the similarity between the template and an image area, a correlation amount, such as a sum of absolute difference (SAD) between corresponding pixels, may be used.

Figure 6A:
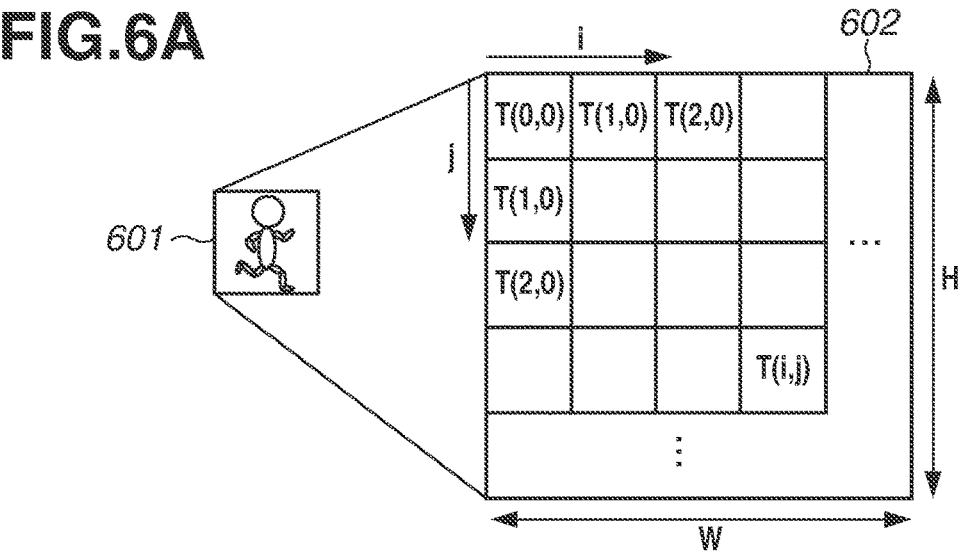
FIGS. 6A to 6C illustrate template matching according to the first exemplary embodiment.

FIG. 6A schematically illustrates a template 601 and a configuration example 602 thereof. In a case where template matching is performed, a pixel pattern used as a template is set in advance as a feature amount area 604. In FIG. 6A, the template 601 has a number W of pixels horizontally and a number H of pixels vertically, and the tracking unit 208 performs pattern matching by using the luminance values of the individual pixels included in the template 601.

A feature amount T(i, j) of the template 601 used for the pattern matching can be represented by the following mathematical equation (2) if the coordinates inside the template 601 are represented by a coordinate system as illustrated in FIG. 6A.

$$T(i,j) = \{T(0,0), T(1,0), T(W-1, H-1)\} \quad (2)$$

Figure 6B:
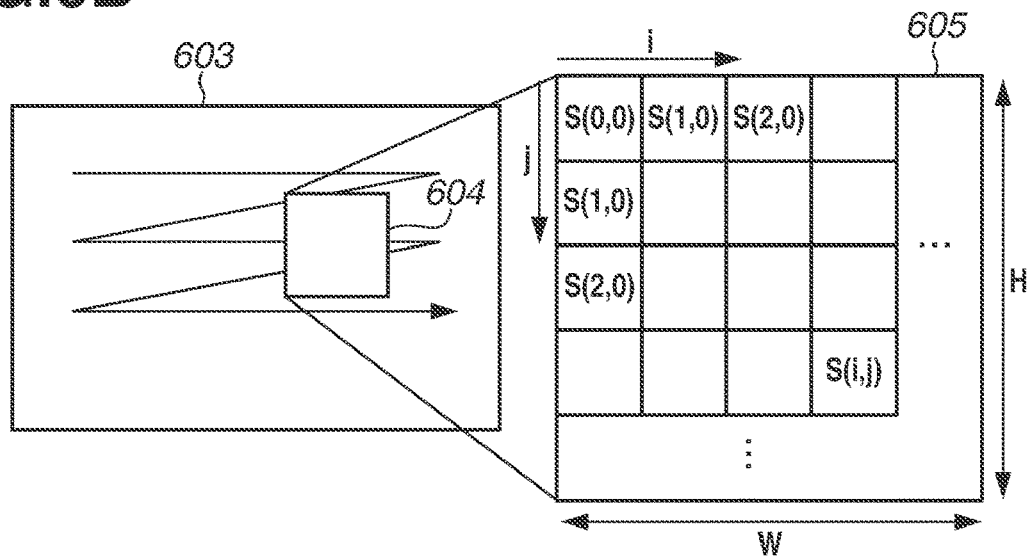

FIG. 6B illustrates an object area search area 603 and a configuration example 605 thereof. The search area 603 is a region on which the pattern matching is performed inside the image and may be the whole or a part of the image. An individual coordinate inside the search area 603 is represented by (x, y). The area 604 has the same size as that of the template 601 (W pixels horizontally and H pixels vertically), and the similarity between the area 604 and the template 601 is calculated. The tracking unit 208 calculates the similarity between the luminance value of an individual pixel included in the area 604 and the luminance value of an individual pixel included in the template 601.

Thus, a feature amount S(i, j) of the area 604 used for the pattern matching can be represented by the following mathematical equation (3) if the coordinates inside the template 601 are represented by a coordinate system as illustrated in FIG. 6B.

$$S(i,j) = \{S(0,0), S(1,0), S(W-1, H-1)\} \quad (3)$$

Figure 6C:
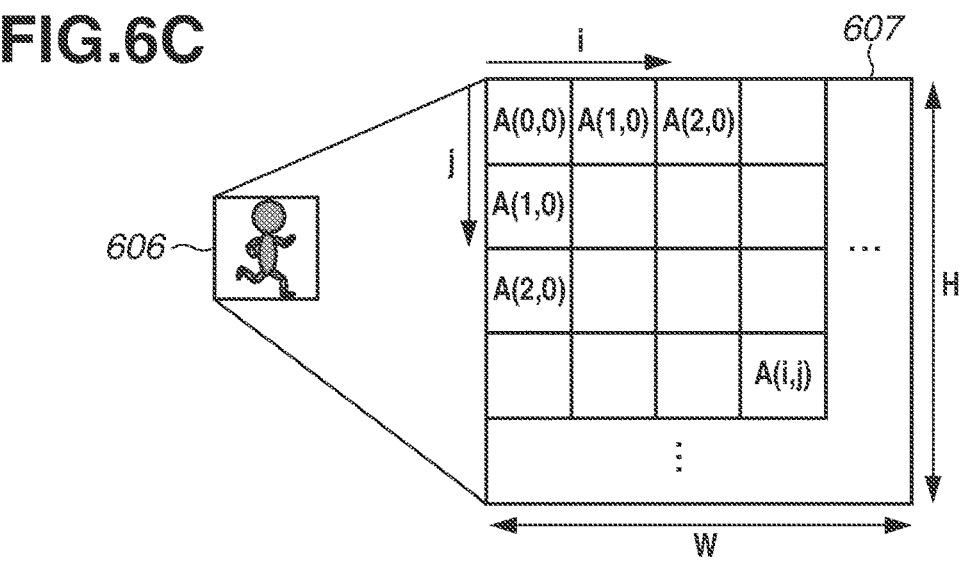

FIG. 6C schematically illustrates a weight map 606 and a configuration example 607 thereof. In FIG. 6C, the area 607 has the same size as that of the template 601 (W pixels horizontally and H pixels vertically), and a weight is applied to the area 607 based on the similarity between the template 601 and the search area 603.

Thus, a weight A(i, j) in the weight map 606 used for the pattern matching can be represented by the following mathematical equation (4) if the coordinates inside the template 601 are represented by a coordinate system as illustrated in FIG. 6C.

$$A(i,j) = \{A(0,0), A(1,0), A(W-1, H-1)\} \quad (4)$$

As an evaluation value V(x, y) obtained by applying a weight to the similarity between the template 601 and the area 604 by using the weight map 606, a SAD value represented by the following mathematical equation (5) is calculated.

$$V(x, y) = \sum_{j=0}^{H-1} \sum_{i=0}^{W-1} (|T(i, j) - S(i,j)| * A(i, j)) \quad (5)$$

In this case, V(x, y) represents an evaluation value at the coordinate (x, y) of the top left corner of the area 604. The tracking unit 208 shifts the area 604 from the top left of the search area 603 in the right direction pixel by pixel. When x=(X−1)(W−1) is reached, X=0 is set, and the tracking unit 208 shifts the area 604 in the lower direction pixel by pixel. The tracking unit 208 calculates the evaluation value V(x, y) at the individual location while shifting the area 604. The coordinate (x, y) indicating the lowest evaluation value V(x, y) calculated indicates the location of the area 604 having a pixel pattern most similar to the template 601. The tracking unit 208 detects the area 604 indicating the lowest evaluation value V(x, y) as the object area that exists within the search area. If the reliability of a search result is low (for example, if the lowest evaluation value V(x, y) exceeds a threshold), the tracking unit 208 may determine that no object area has been found.

The above description has been made based on an example in which a luminance value is used as a feature amount for the pattern matching. However, a feature amount having a plurality of values (for example, brightness, hue, and color saturation) may alternatively be used. In addition, while the above description has been made based on an example in which a SAD value is used as a similarity evaluation value, other evaluation values may alternatively be used. For example, values based on normalized cross-correlation (NCC) or zero-mean normalized cross correlation (ZNCC) may alternatively be used.

Advantageous Effects

As described above, according to the present exemplary embodiment, since weights are applied to a feature amount area based on motion vectors, the object tracking performance can be improved even in a case where an object has a plurality of motions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-212895, filed Dec. 22, 2020, which is hereby incorporated by reference herein in its entirety.

What is claimed is:

1. An object tracking apparatus comprising:
    at least one processor and memory holding a program which, when executed by the processor, causes the processor to function as:
    a motion vector calculation unit configured to calculate a motion vector between images;
    a feature amount area determination unit configured to determine an area of an object detected from an image as a feature amount area;
    a reliability evaluation unit configured to evaluate a reliability of the motion vector between the images and a motion vector in the feature amount area;
    a weight map creation unit configured to create a weight map, which is a distribution of weights of areas for which motion vectors have been calculated, based on the motion vector between images, the reliability, and the motion vector in the feature amount area; and
    an object tracking unit configured to track the object based on the weight map.

2. The object tracking apparatus according to claim 1 wherein, based on a difference between the motion vector between images and the motion vector in the feature amount area, the weight map creation unit calculates motion vectors in local areas of the motion vector in the feature amount area and creates a weight map by using the motion vectors in the local areas.

3. The object tracking apparatus according to claim 1, the motion vector in the feature amount area is calculated as a bin having a maximum number of motion vectors by performing histogram processing on the motion vector between images within the feature amount area.

4. The object tracking apparatus according to claim 1, wherein, in a case where a motion vector in a local area indicates a second value larger than a first value, the weight map creation unit sets a low weight for the local area in the weight map.

5. The object tracking apparatus according to claim 1, wherein, in a case where the reliability in an area indicates a second value smaller than a first value, the weight map creation unit sets a low weight for the area in the weight map.

6. An imaging apparatus comprising:
    an imaging element configured to capture an image of an object formed via an imaging optical system; and
    the object tracking apparatus according to claim 1.

7. The imaging apparatus according to claim 6 comprising:
    a circuit configured to refer to the motion vector between images and correct an image blur by driving a lens included in the imaging optical system.

8. The imaging apparatus according to claim 6 comprising:
    a circuit configured to refer to the motion vector between images and corrects an image blur by controlling a position of the imaging element included in the imaging apparatus.

9. A control method for an object tracking apparatus comprising:
    calculating a motion vector between images;
    determining an area of an object detected from an image as a feature amount area;
    evaluating a reliability of the motion vector between images and a motion vector in the feature amount area;
    creating a weight map, which is a distribution of weights of areas for which the motion vectors have been calculated, based on the motion vector between images, the reliability, and the motion vector in the feature amount area; and
    tracking the object based on the weight map.

10. A non-transitory computer-readable storage medium storing a program for causing a computer to execute a method of controlling an image processing apparatus, comprising:
    calculating a motion vector between images;
    determining an area of an object detected from an image as a feature amount area;
    evaluating a reliability of the motion vector between images and a motion vector in the feature amount area;
    creating a weight map, which is a distribution of weights of areas for which the motion vectors have been calculated, based on the motion vector between images, the reliability, and the motion vector in the feature amount area; and
    tracking the object based on the weight map.

* * * * *